US007346614B2

(12) United States Patent
Hasida

(10) Patent No.: US 7,346,614 B2
(45) Date of Patent: Mar. 18, 2008

(54) INFORMATION SEARCHING METHOD, INFORMATION SEARCHING PROGRAM, AND COMPUTER-READABLE RECORDING MEDIUM ON WHICH INFORMATION SEARCHING PROGRAM IS RECORDED

(75) Inventor: Koiti Hasida, Chiba (JP)

(73) Assignees: Japan Science and Technology Corporation, Kawaguchi-shi, Saitama (JP); National Institute of Advanced Industrial Science and Technology, Chyoda-ku, Tokyo (JP)

( * ) Notice: Subject to any disclaimer, the term of this patent is extended or adjusted under 35 U.S.C. 154(b) by 677 days.

(21) Appl. No.: 10/492,760

(22) PCT Filed: Oct. 17, 2001

(86) PCT No.: PCT/JP02/04945

§ 371 (c)(1),
(2), (4) Date: May 14, 2004

(87) PCT Pub. No.: WO03/034279

PCT Pub. Date: Apr. 24, 2003

(65) Prior Publication Data

US 2006/0212424 A1 Sep. 21, 2006

(51) Int. Cl.
*G06F 17/30* (2006.01)

(52) U.S. Cl. ............................... 707/5; 707/3; 707/101

(58) Field of Classification Search .................... 707/2, 707/3, 5, 6, 10, 101, 102; 715/513
See application file for complete search history.

(56) References Cited

U.S. PATENT DOCUMENTS 5,297,039 A 3/1994 Kanaegami et al.

(Continued)

FOREIGN PATENT DOCUMENTS

JP 01-140332 6/1989

(Continued)

OTHER PUBLICATIONS

Peter Clark et al. Exploiting a Thesaurus-Based Semantic Net for Knowledge-Based Search. 2000, AAAI Ptess / The MIT Press. In Proceedings of the Seventeenth National Conference on Artificial intelligence and Twelfth Conference on innovative Applications of Artificial intelligence (Jul. 30-Aug. 3, 2000), pp. 988-995.*

(Continued)

*Primary Examiner*—Luke S Wassum
*Assistant Examiner*—Jason Alvesteffer
(74) *Attorney, Agent, or Firm*—J. Harold Nissen; Lackenbach Siegel, LLP

(57) ABSTRACT

This invention relates to the subject matter identified in the title. An effective interaction is conducted by giving the user adequate information during information search so as to improve the search efficiency and accuracy. A CPU initially sets a set G containing deleted solution candidates to null and receives input for a search question Q from the user (S1). The CPU refers to a database storage section and creates a solution candidate set F as the result of the search of the database (D) in response to the search question Q by using the similarity of labels defined by a thesaurus T or a subset R of the thesaurus T (S2). The CPU presents the user the information concerning the solution candidates and search question Q as the help for interaction on a display part (S3). The user can check if there is a solution among the solution candidates.

25 Claims, 6 Drawing Sheets

U.S. PATENT DOCUMENTS

| | | | | |
|---|---|---|---|---|
| 5,421,008 A * | 5/1995 | Banning et al. | ............... | 707/4 |
| 6,269,368 B1 * | 7/2001 | Diamond | ....................... | 707/6 |

FOREIGN PATENT DOCUMENTS

| | | |
|---|---|---|
| JP | 04-005760 | 1/1992 |
| JP | 2000-099226 | 4/2000 |
| JP | 2000-123401 | 4/2000 |
| JP | 2001-195428 | 7/2001 |
| JP | 2001-249935 | 9/2001 |
| JP | 2001-282811 | 10/2001 |
| WO | WO 99/21110 | 4/1999 |
| WO | WO 03/034279 | 10/2001 |

OTHER PUBLICATIONS

Hasida, Kait, Toyoura, Jan; Tsudaka Shinichiro Semantic Information Petrieval From Structural Documents—Japan—May 24, 1999.

Fernando Pereira, Naftali Tishby, Lillian Lee; Distributional Clustering of English Words; (Apr. 25, 1993) Proceedings of ACL. '93, pp. 183-190.

Tokunaga, Takenobu; Iwayama, Makoto Tanaka, Hozumi.; Automatic Thesaurus Construction Based on Gramatical Relations 95-TR007. Jan. 1995. Department of Computer Science, Tokyo Institue of Technology.

Donald Hindle, AT&T Bell Laboratories, HE on Classification From Predicate Argument Structure, pp. 268 to 275.

[PS] Magazine, vol. 39, No. 9, Sep. 1998 Japan, pp. 861-865.

* cited by examiner

F

- ANALYZE ... THE LANGUAGE ... WITH A PROGRAM
- A FUNCTION REPRESENTING ... AN INTENDED INVESTMENT
- WISH TO AUTOMATICALLY REARRANGE ... THE CONTENTS
- PRESUMING ... IMPLICIT WILL
- PROGRAM ... THE MEANING OF DATA ... THAT CANNOT BE COMPREHENDED
- STANDS FOR

INFORMATION SEARCHING METHOD, INFORMATION SEARCHING PROGRAM, AND COMPUTER-READABLE RECORDING MEDIUM ON WHICH INFORMATION SEARCHING PROGRAM IS RECORDED

TECHNICAL FIELD

This invention relates to an information retrieval method, an information retrieval program and to a computer-readable recording medium on which the information retrieval program is recorded. More specifically, the invention relates to an interactive information retrieval method related to labeled graphs, an information retrieval program and to a computer-readable recording medium on which the information retrieval program is recorded.

BACKGROUND OF THE INVENTION

In the traditional information retrieval, a query consists of keywords and ID numbers combined with logical connectives such as AND and OR. Character-string matching and statistical methods have been basic technologies there. For the interaction with the user, keywords/words and phrases characterizing several subsets of the set of solution candidates are found by statistical methods, and presented as hints to let the user select some of them to augment the query. Related art has been disclosed in the following documents:

Yoshihiko Hayashi, Yoshitsugu Obashi, "Technical Trend of Retrieval Service on WWW", Information Processing, Vol. 39, No. 9, 1998, and Sumio Fujita, "Approach to Retrieving/Classifying Information by utilizing Natural Language Processing", Information Processing, Vol. 40, No. 4, 1999.

SUMMARY OF THE INVENTION

Difficulty in the information retrieval usually stems from the difficulty in filling the gap in the expression between the retrieval query and the solution (difficulty in predicting the expression of solution from the retrieval query). Suppose a candidate "President Tanaka was hit by a car in the U.S.A." is detected for a retrieval request "a Japanese businessman involved in an accident while he is on business trip overseas". In this case, a complex inference is necessary, but automating such an inference is technically impossible for the time being.

Therefore, there will be no other way to conduct such an inference but to rely upon the interaction between the human user and the machine. To realize the interaction, the machine must provide a hint to the user concerning what to do at each stage of the interaction. The above conventional method of giving a hint based on the statistic method can deal with the general nature of a set of candidates but cannot deal with the structure specific to a particular retrieval query.

To give the user an effective hint for the interaction, further, the structure specific to the retrieval query must be reflected on the retrieval. For example, the retrieval query "a Japanese businessman involved in an accident while he is on business trip overseas" has a semantic structure containing relations between "a Japanese" and a "businessman", "businessman" and "on business trip", "overseas" and "on business trip", and "on business trip" and "accident". However, such a structure has almost not been employed by the conventional information retrieval. In particular, it has never been systematically used as a clue to the interaction.

An objective of this invention is to improve the efficiency and accuracy of retrieval by conducting an effective interaction by giving proper information to the user in the information retrieval.

Another objective of this invention is to conduct the information retrieval maintaining a high efficiency and a high pin-point accuracy by utilizing and the semantic structure specific to the retrieval query, and by interactively revising the retrieval query and retrieval space while automatically narrowing down the retrieval space.

A further objective of this invention is to treat the retrieval query and the database to search as graphs without formal structure like a sentence of a natural language, and to improve the efficiency and accuracy of retrieval enabling the user to conduct a retrieval engine and a suitable interaction with the structure as a clue.

According to the first means for solution of the invention, there are provided an information retrieval method, an information retrieval program and a computer-readable recording medium on which the information retrieval program is recorded, including:

a step in which the processing unit receives, through the input unit, input for a retrieval query Q including information related to nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using similarity among the labels defined by a subset R of thesaurus T, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates represent the solutions;

a step in which the processing unit deletes some elements in the set F of solution candidates from the set F of solution candidates according to input information;

a step in which the processing unit deletes, adds or changes the content of the subset R and/or the retrieval query Q based on input information related to deleting, adding or changing the subset R of the thesaurus T and/or the retrieval query Q input through the input unit; and a step of returning to the step of retrieval if there is a request for re-retrieval from the user, or ending the processing if there is no such request.

According to the second means for solution of the invention, there are provided an information retrieval method, an information retrieval program and a computer-readable recording medium on which the information retrieval program is recorded, including:

a step in which a processing unit receives, through an input unit, input for a retrieval query Q containing information related to nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of the thesaurus T determined to be usable according to the links that are input, and making reference to a database D storing the nodes and labels that are input;

a step in which the processing unit displays a set F of solution candidates that are found on the display unit;

a step in which the processing unit receives, through the input unit, input information related to whether some elements in the set F of solution candidates are representing the solutions;

a step in which the processing unit deletes some elements in the set F of solution candidates from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit; and a step of returning to the step of retrieval if there is a request for re-retrieval from the user to repeat the processing, or ending the processing if there is no request.

In this invention, the processing unit further can execute the steps of:

displaying the retrieval query Q on a display unit;

receiving, through an input unit, input information which, when there is no link connecting two nodes of the retrieval query Q, instructs to insert a link;

inserting the link according to input information;

receiving, through the input unit, input information for instructing the deletion of a link in the retrieval query Q;

deleting the link according to the input information;

receiving, through the input unit, input information for instructing the addition of a new node to the retrieval query Q;

adding the node to the retrieval query Q according to the input information;

receiving, through the input unit, input information for instructing the deletion of a node in the retrieval query Q; and deleting the node from the retrieval query Q according to the input information.

In this invention, the processing unit can execute the steps of:

displaying, on the display unit, a list of labels M of nodes in the database D, such that values T(L, M) representing the degree of similarity between M and the label L of a node in the retrieval query Q is defined by the thesaurus T in the thesaurus storage unit;

receiving, through the input unit, input information instructing that some labels M be selected or not selected, input information instructing a change in the value T(L, M) for some labels M, and input information for specifying some arbitrary labels; and permitting the definition of T(L, M) to be used in the thesaurus T for the selected label M, inhibiting the definition of T(L, M) from being used for the unselected element M, changing the value of T(L, M) into a specified value for the specified label M, or setting the value of T(L, M) to 1 while permitting the definition of T(L, N) to be used for each specified label N.

In this invention, the processing unit can execute the steps of:

displaying the following list on the display unit, for each node x in the retrieval query Q {L| For a node y and a node z∊F(x), L is the label of y and the link y-z is contained in the database D.} receiving, through an input unit, input information for instructing that some labels be selected; and adding a node Y with L as a label and a link x-y to the retrieval query Q for each of the selected labels L according to the input information.

In the invention, further, for each label M in the above list, when the size of the following set is smaller than a predetermined value, the processing unit can display, on a display unit, labels of some nodes around y in addition to the label M as elements of the above list, for every element y of the following set.

{y The label of y is M.

For a node z∊F(x), the link y-z is contained in the database D.}

In this invention, the processing unit can execute the steps of:

displaying, on a display unit, a list of labels of nodes z which are included in the shortest paths connecting a node f(x) to a node f(y) in the range of a solution candidate f for a solution candidate f of which the range f(Q) does not include the node z, for each of the links x-y in the retrieval query Q;

receiving, through the input unit, input information for so instructing that some of such labels be selected; and adding a node z with the element of the list as a label, and links x-z and z-y to the retrieval query Q according to the input information.

DETAILED DESCRIPTION OF PREFERRED EMBODIMENTS OF THE INVENTION

This embodiment considers a graph (network) with labels at the nodes as the above-mentioned semantic structure. It is presumed that both the retrieval query Q and the database D to be retrieved are such graphs. Based on an approximate matching or the like among the graphs, further, the retrieval query Q and the retrieval space are allowed to be modified interactively and effectively. In the case of retrieval a sentence, for example, the nodes are objects of referenced by words, a link is a semantic relationship between them, and a label is a word.

In this embodiment, the "retrieve/retrieval" is to find a subgraph of the database D resembling the retrieval query Q. It is considered that each node of the retrieval query Q corresponds to some of the nodes of the partial graph. Such a correspondence relationship is expressed by a function mapping each node in the retrieval query Q to a node in the database D, and the function is called a solution candidate. It is further presumed that the scores (e.g., degree of similarity, degree of relationship, values related to probability) of the candidates are defined. A set of several solution candidates having high scores is referred to as a set F of solution candidates, and there are established, F(x)={f(x)|f∊F} (x is a node in retrieval query Q, and f(x) is a node in the database corresponding to the node x), and f(Q)={f(x)|x is a node in retrieval query Q}(f∈F)

The retrieval query Q, the set F of solution candidates and the like will now be concretely described.

Figure 1:
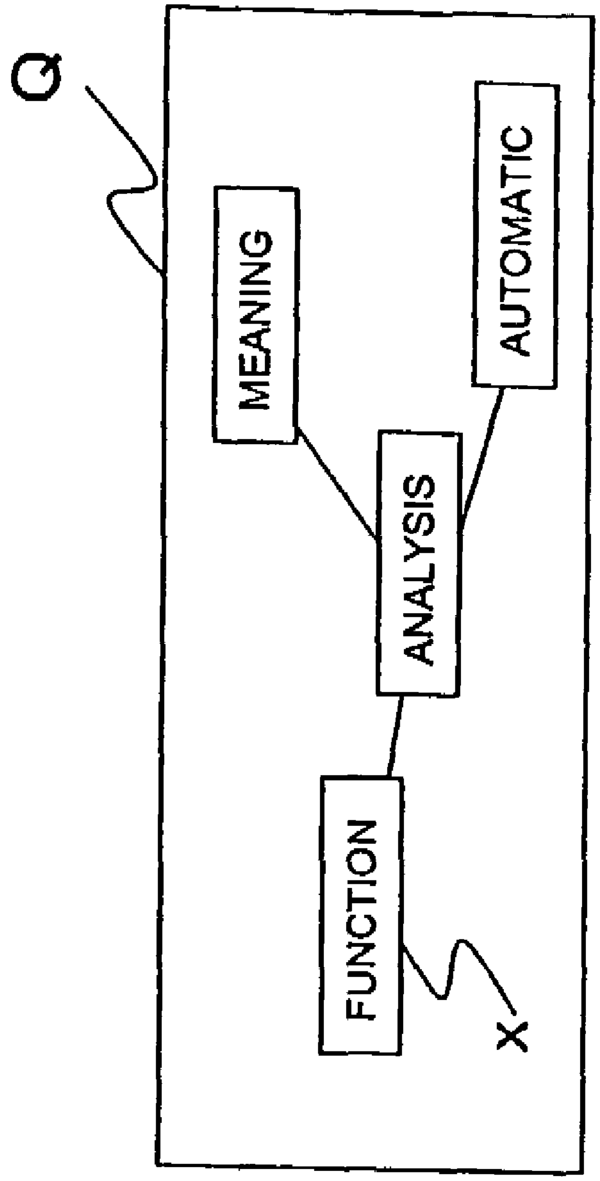
FIG. 1 is a diagram illustrating nodes, links and a retrieval query Q.

FIG. 1 is a diagram illustrating the nodes, links and retrieval query Q.

The nodes x in the retrieval query Q and labels thereof are, for example, "function", "analysis, "meaning" and "automatic".

The links in the retrieval query Q are "function-analysis", "analysis-meaning" and "analysis-automatic".

The retrieval query Q is as shown, constituted by the nodes and labels.

Figure 2:
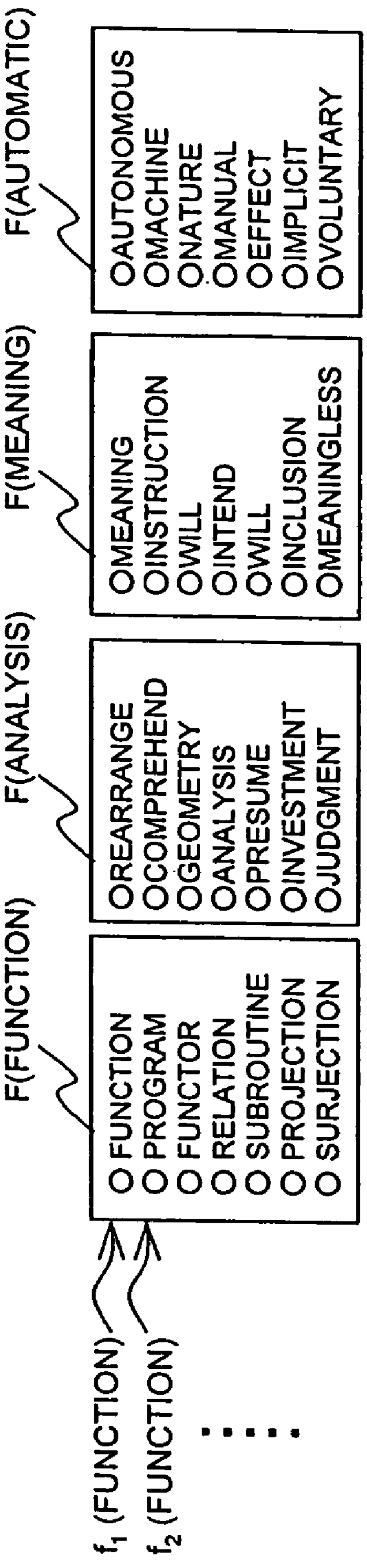
FIG. 2 is a diagram illustrating thesaurus expansion of labels included in the retrieval query Q.

FIG. 2 is a diagram illustrating nodes f(x) in the database corresponding to the nodes x in retrieval query Q in the solution candidates f, and sets F(x) of nodes in the database corresponding to x in the set F of candidates.

When, for example, x is node (labeled with) "function", f(x) is expressed as f(function), ($f_1$ (function), $f_2$ (function) - - - ), one of "function", "program", "functor", "relation", "subroutine", "projection" and "subjection" as a label.

When, for example, x is node (label) "function", F(x) is expressed as F(function), and stands for the set {"function", "program", "functor", "relation", "subroutine", "projection", "subjection"} of the f(function) over all f∈F.

Figure 3:
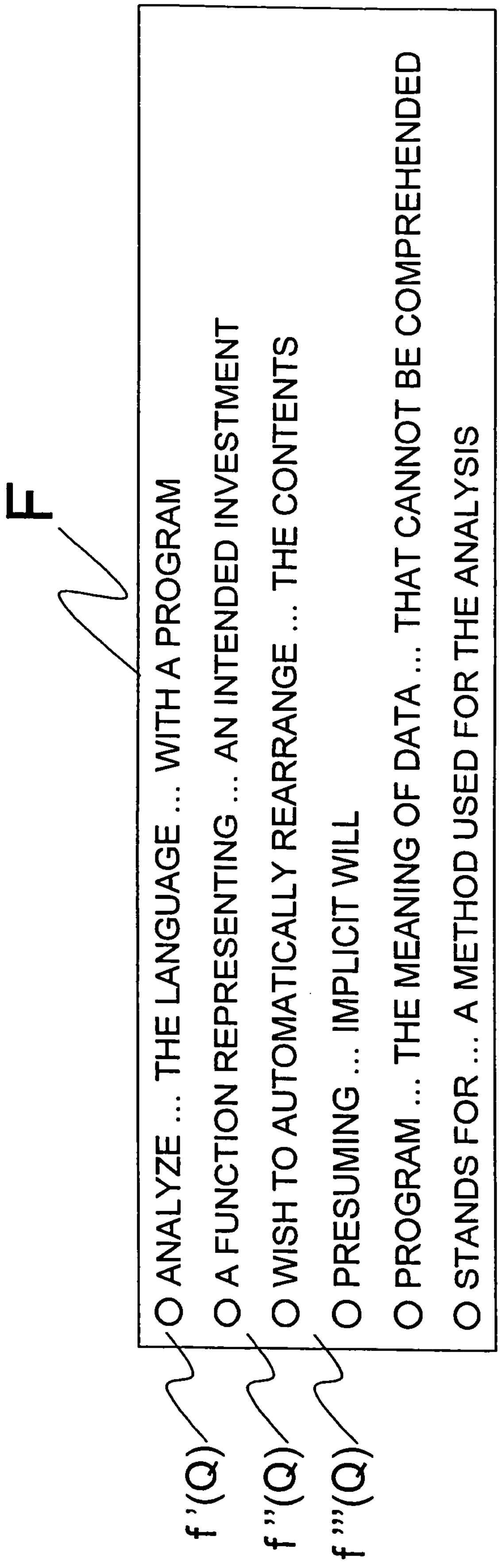
FIG. 3 is a diagram illustrating the solution candidates and a set F of solution candidates for the retrieval query Q.

FIG. 3 is a diagram illustrating ranges f(Q) of solution candidates f in the retrieval query Q and the set F of solution candidates. f'(Q), f''(Q) and f'''(Q) are ranges of solution candidates f', f'' and f'''.

f(Q)s correspond to "analyze . . . the language . . . with a program", "a function representing . . . an intended investment", "wish to automatically rearrange . . . the contents", "presuming . . . implicit will", "program . . . the meaning of data . . . that cannot be comprehended", and "stands for . . . a method used for the analysis", respectively.

F is a set of f, expressed as a set of f(Q), and stands for {"analyze . . . the language . . . with a program", "a function representing . . . an intended investment", "wish to automatically rearrange . . . the contents", "presuming . . . implicit will", "program . . . the meaning of data . . . that cannot be comprehended", stands for . . . a method used for the analysis"}.

In the embodiment described below, further, the thesaurus T is, for example, a partial function from a combination of a label L and a label M of nodes in the graph to a numerical value T(L, M) representing the degree of similarity between the two labels, and is used for the calculation of scores. At the time of finding a set F of solution candidates, there is used a subset R of thesaurus T instead of using the whole thesaurus T. For example, the thesaurus T includes a portion R that can be used being determined in advance by the user through the input unit or the storage unit, and the other portion that cannot be used. The set F of solution candidates is found not by using the whole thesaurus T but by using a utilizable portion R of the thesaurus T. Several methods have been known ("execution of retrieval" in a flowchart of FIG. 5 described later and the description related to step S2 thereof) for finding a set F of solution candidates from the definition of score, expression of graph, database D, thesaurus T or a subset R of T and retrieval query Q, and can be suitably employed, though they are not described here in detail.

For example, a score representing the similarity between the label "function" and "analysis" is given as a numerical value T (function, analysis) by the thesaurus T stored in the thesaurus storage unit 6.

Figure 4:
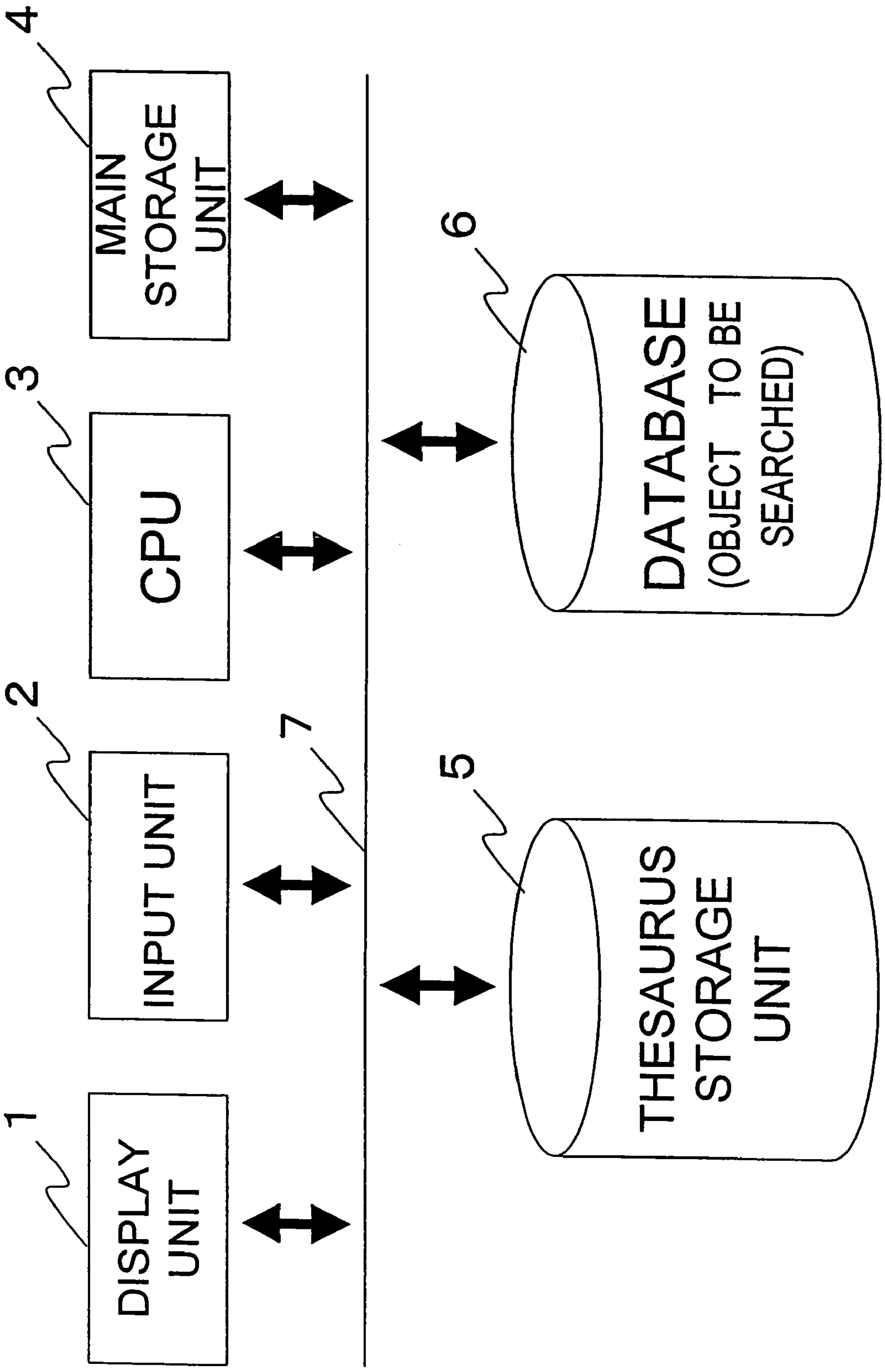
FIG. 4 is a diagram illustrating the architecture of the retrieval system.

FIG. 4 is a diagram illustrating the constitution of a retrieval apparatus.

The retrieval system includes a display unit 1, an input unit 2, a processing unit (CPU) 3, a main storage unit 4, a thesaurus storage unit 5, a database (object to be retrieved) 6 and a bus 7.

The processing unit 3 is connected to the input unit 2, display unit 1, main storage unit 4, thesaurus storage unit 5 and database (search space) 6 through the bus 7, and receives and outputs various kinds of information. The display unit 1 is a display device for displaying, for example, retrieval input, retrieval output, interim results of retrieval and the like on a screen. The input unit 2 is means for receiving various kinds of data or the like necessary for, for example, the retrieval query, instruction and retrieval the conditions or the like, and a suitable device is used such as a keyboard, a mouse, a pointing device or the like. The input unit 2 may further be provided with an output unit for sending data to other units, storage medium and the like. The main storage unit 4 stores various data such as retrieval program, initial setting and parameters, as well as data related to the retrieval conditions such as the final results of retrieval and interim results. The thesaurus storage unit 5 stores the thesaurus T which includes the data representing relationships among the nodes necessary for the retrieval, degree of relation or degree of non-relation, degree of similarity or degree of difference, probability, certainty and the like. The database 6 stores the data (database D) to be retrieved, i.e., storing the nodes, labels, links and the like.

Figure 5:
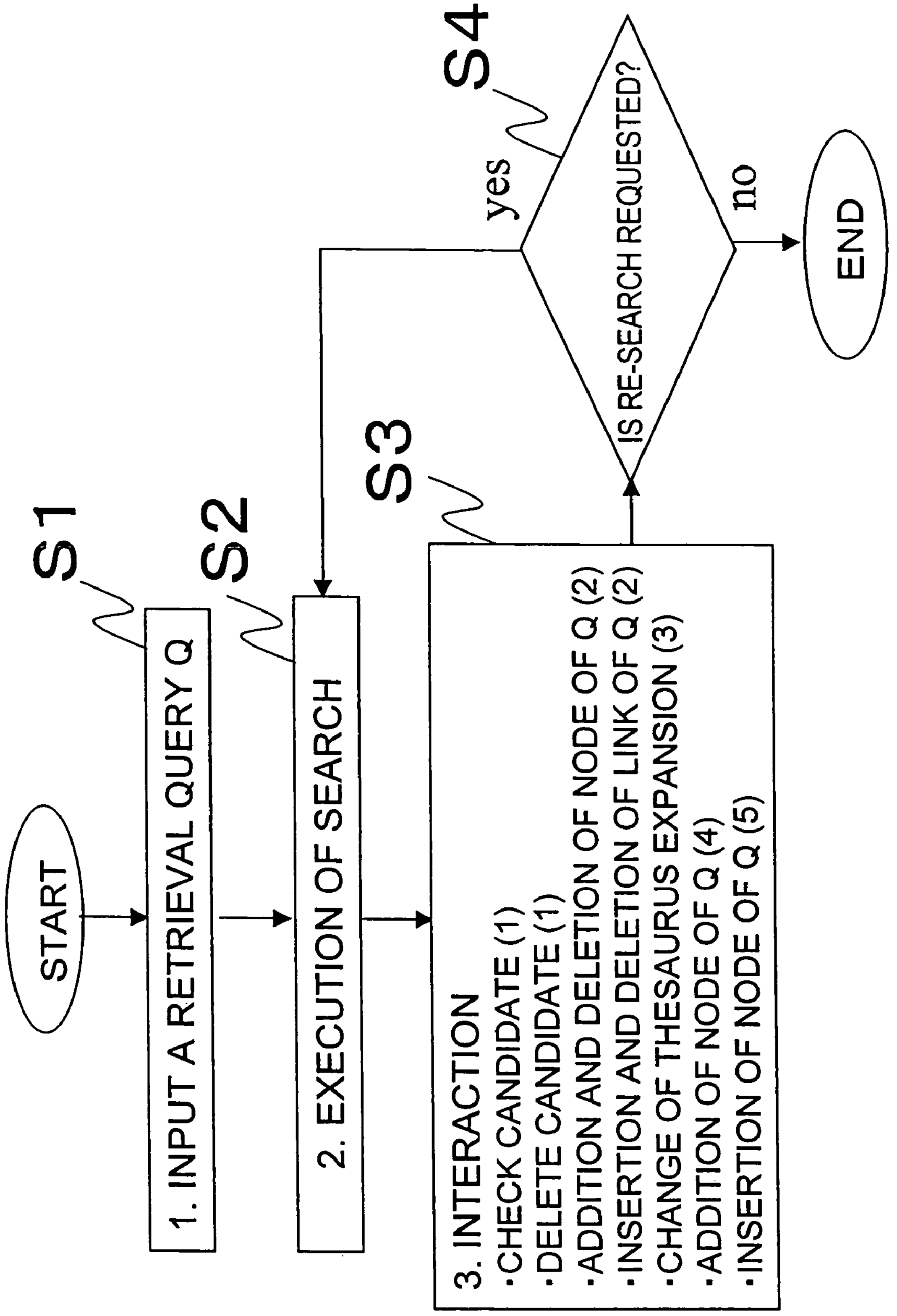
FIG. 5 is a flowchart of an information retrieval processing.

FIG. 5 is a flowchart illustrating a retrieval processing. The retrieval is conducted according to the following procedure.

As the initial input, first, the database D is stored in advance in the database storage unit 6, and the thesaurus T or a subset R, that is, part of the thesaurus T is stored in advance in the thesaurus storage unit 5.

At step S1, the CPU 3 initializes the set G of the deleted solution candidates to null, and receives from the user the input of retrieval query Q containing information related to the nodes, labels of nodes and links among the nodes. The CPU 3 stores the data related to the retrieval query Q in a suitable storage portion of the main storage unit 4, and reads them therefrom as required.

At step S2, when the user clicks a "RETRIEVAL EXECUTION BUTTON" displayed on the display unit 1 the CPU 3 initiates the retrieval (or re-retrieval) as requested by the user. The CPU 3 makes reference to the thesaurus storage unit 5 and the database storage unit 6 according to the retrieval query Q that is input, and finds a set F of solution candidates as a result of searching the database D according to the retrieval query Q by using a degree of similarity among the labels defined in a portion R that is usable of the thesaurus T of the thesaurus (this method has been known as mentioned above, and is not described here). Here, neither the solution candidates which are the elements of the set G of the deleted solution candidates nor the solution candidates including the elements of the set G of the deleted solution candidates, are included in the set F of solution candidates (the solution candidate is a function which is a set of ordered pairs and, hence, an inclusion relation holds among the solution candidates).

At step S3, the CPU 3 offers the following information (1) to (5) to the user through the display unit 1 as a clue to the interaction (the display of a list of (2), (4) and (5) complies with the order of decreasing maximum score values of solution candidates, for example, including nodes having labels which are the elements of the list). The user is allowed to check whether the solution candidates in the set F of solution candidates are solutions, or to change the set F of solution candidates, the set G of deleted solution candidates, the thesaurus T or the subset R of thesaurus T and the retrieval query Q in an itemized manner depending upon the following information. The CPU 3 displays information related to each of the case list elements on the display unit 1. The CPU 3 deletes, adds or changes the case list elements according to information input by the user through the input unit 2, stores the data in the main storage unit 4, and suitably reads the thesaurus related to the data and the data related to the search space from the thesaurus storage unit 5 and the database 6.

Figure 6:
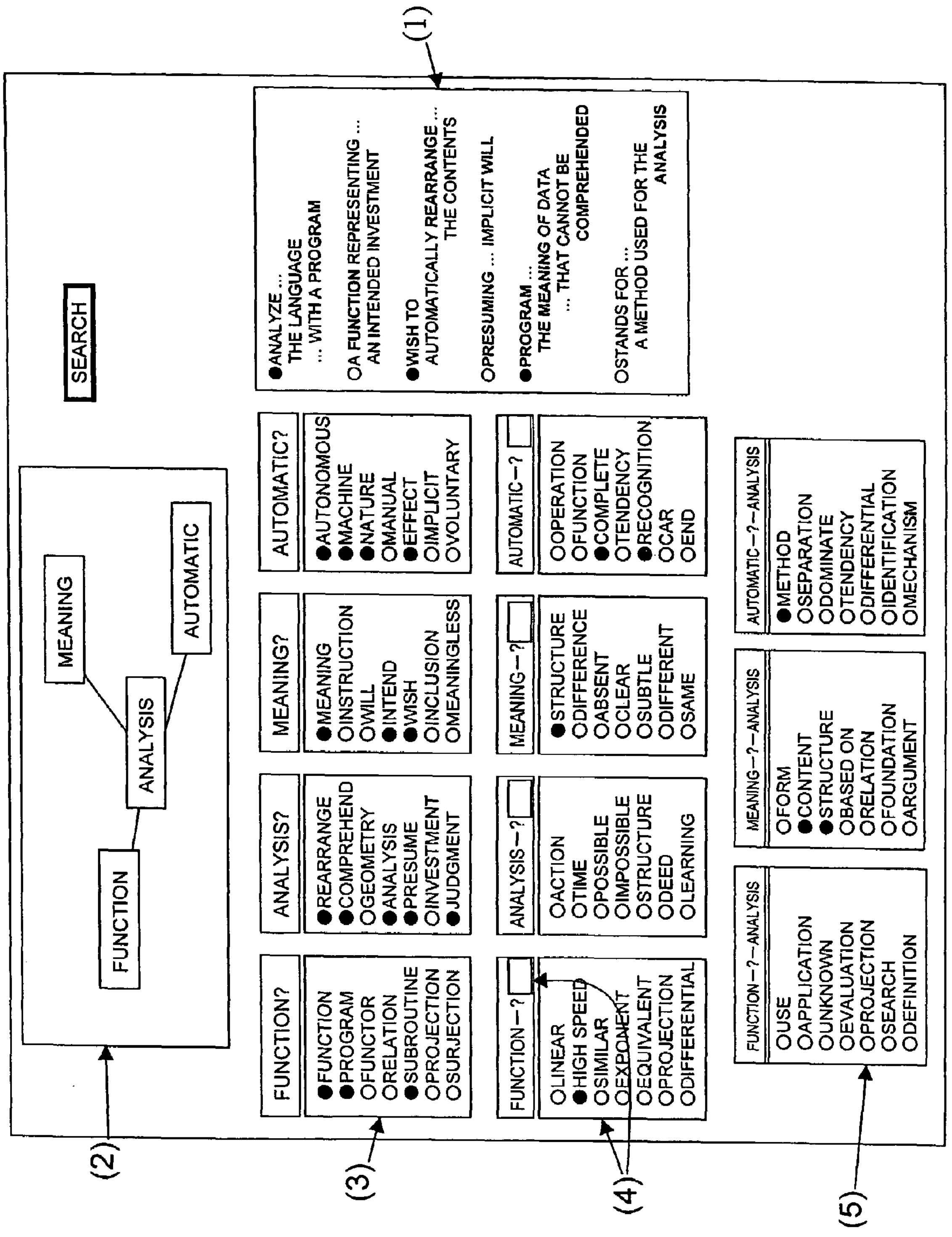
FIG. 6 is a diagram illustrating a display screen.

FIG. 6 is a diagram illustrating a display screen. This diagram illustrates a display of the procedure at step S3 concerning the retrieval of a sentence of a natural language and an interface for supporting the interaction. (1) to (5) in the drawing correspond to (1) to (5) described below.

(1) Set F of solution candidates.

Displayed here is a list of solution candidates having high scores. In the drawing, bold characters represent words corresponding to the thesaurus expansion of words in the retrieval query. The user can carry out the operation on the display in a manner as described below.

- Check whether some elements in the set F of solution candidates are solutions. This can be done by, for example, using only those data that are displayed on the list. When they cannot be checked by those data only, the individual solution candidates are clicked to display a wider surrounding range.
- Some elements in the set F of solution candidates are deleted from the set F of solution candidates and are registered as elements of the set G of the deleted solution candidates. This in FIG. 6 is to exclude the solution candidates (represented by black circles in the drawing) included in F from F (as represented by open circles).

(2) Retrieval query Q.

Here, a retrieval query is displayed. The user is allowed to add or delete nodes, and to insert or delete links as described below.

- In some cases where there is no link connecting two nodes in the retrieval query Q, such insert such a link.
- Delete some link from the retrieval query Q.
- Add some new node to the retrieval query Q.
- Delete some node from the retrieval query Q.

(3) Displayed here are the results having high scores obtained by expanding the labels ("functions", etc. in FIG. 6) of nodes in the retrieval query Q by using thesaurus. More specifically, this is a list of labels (elements) M of nodes of the database D in which T(L, M) is defined in the thesaurus T concerning the labels L of nodes x (for each of the nodes x of the retrieval query Q). The user can specify weather the elements be included in the retrieval range (represented by black circles in FIG. 6) or not (represented by open circles).

- Subset R of the thesaurus T which has not defined R(L, M) for several elements M of the list, is expanded for their definition such that R(L, M)=T(L, M). Or, concerning some elements M of the list, the definition of T(L, M) can be used in the thesaurus T.
- For some elements M of the list that have been defined for their R(L, M), the definition of R is reduced and R(L, M) is not defined. Equivalently, for some elements M of the list, use of the definition T(L, M) is inhibited.

(4) Displayed here are labels of nodes that can be added to the retrieval query being directly connected to the nodes (such as "functions" in FIG. 6) of the retrieval query Q. In more details, the list is the list of the labels L for which there exists a node z∊F(x) and a node y such that the link y-z is included in the database D (for each in the nodes x of the retrieval query Q) and the label of y is L. When there are small number of such that there exists a node z∊F(x) and the link y-z is in the database D and the label of y is L) corresponding to the label L, the labels of some nodes around y may be added to L as an element of the list for every such y. The user can specify whether the retrieval query Q can be expanded (black circles) or not (open circles) depending upon the elements of the list in a manner as described below.

- A node Y with M as a label and a link x-Y are added to the retrieval query Q concerning some element M of the list. Namely, the retrieval query Q is expanded by M. M can also be directly input instead of being selected from the list.

(5) Displayed here are labels of nodes to be inserted between the two nodes (between the "function" and the "analysis" in FIG. 6) of the retrieval query Q. In more detail, this is a list of labels of nodes z included in the shortest paths connecting the node f(x) to the node f(y) in the solution candidate f (for each of the links x-y of the retrieval query Q) and not contained in the range f(Q) for some solution candidate f. The user can specify whether each element of the list be inserted in the retrieval query Q (represented by black circles in FIG. 6) or not (represented by open circles) in a manner as described below.

- A node z having the specified element of this list as a label, a link x-z and a link z-y are added to the retrieval query Q. Namely, this element is inserted in the retrieval query Q.

Step S4 returns back to step S2 if the user requests the re-retrieval by clicking the "RETRIEVAL EXECUTION BUTTON". On the other hand, the processing ends if there is no request for the re-retrieval.

The information retrieval method and the information retrieval apparatus/system of the invention can be provided as an information retrieval program for having a computer execute the procedures, as a computer-readable recording medium on which an information retrieval program is recorded, as a program product which includes an information retrieval program and can be loaded in an internal memory of a computer, and as a computer such as a server including a program.

INDUSTRIAL APPLICABILITY

The invention makes it possible to improve the efficiency and accuracy of information retrieval by conducting an effective interaction by giving appropriate information to the user in the information retrieval as described above. The invention makes it possible to conduct the information retrieval maintaining a high efficiency and a high pin-point accuracy by interactively inputting or revising the retrieval query and retrieval range while automatically narrowing down the retrieval space by utilizing a database and a graph structure specific to the retrieval query.

The invention further makes it possible to treat the retrieval query and the database as graphs having an indefinite structure like natural-language sentences, and to improve the efficiency and accuracy of retrieval enabling the user to interact with the retrieval engine with the structure as a clue.

The invention claimed is:

1. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to a thesaurus storage unit storing thesaurus T for defining a degree of similarity among the labels of nodes, using similarity among the labels defined by a subset R of thesaurus T according to links that are input, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates are representing the solutions;

a step in which the processing unit deletes some elements in the set F of solution candidates from the set F of solution candidates according to input information;

a step in which the processing unit deletes, adds or changes the contents of the subset R and/or the retrieval query Q based on input information related to deleting, adding or changing the subset R of the thesaurus T and/or the retrieval query Q input through the input unit;

a step of returning to the step of retrieval if there is a request for re-retrieval from the user to repeat the processing, or ending the processing if there is no request;

a step in which the processing unit displays, on a display unit, a list of labels M of nodes of a database D, such that the value T(L, M) representing the degree of similarity between a label L of a node x and a label M of a node is defined in the thesaurus T in the thesaurus storage unit, for every node of the retrieval query Q;

a step in which the processing unit receives, through an input unit, input information for so instructing that each such label M be selected or not selected; and a step in which the processing unit, according to the input information, expands the definition of the subset R to include R(L, M)=T(L, M) concerning those M for which R(L, M) has not been defined in the subset R of the thesaurus T, or reduces the definition of R so as not to define R(L, M) concerning those M for which R(L, M) has been defined.

2. An information retrieval method according to claim 1, further including:

a step in which the processing unit displays a retrieval query Q on the display unit where Q is a graph;

a step in which the processing unit receives, through the input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link in the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q without an end point of the link; and a step in which the processing unit deletes the node from the retrieval query Q according to input information.

3. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to a thesaurus storage unit storing thesaurus T for defining a degree of similarity among the labels of nodes, using similarity among the labels defined by a subset R of thesaurus T according to links that are input, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates are representing the solution;

a step in which the processing unit deletes some elements in the set F of solution candidates from the set F of solution candidates according to input information;

a step in which the processing unit deletes, adds or changes the contents of the subset R and/or the retrieval query Q based on input information related to deleting, adding or changing the subset R of the thesaurus T and/or the retrieval query Q input through the input unity;

a step of returning to the step of retrieval if there is a request for re-retrieval from the user to repeat the processing, or ending the processing if there is no request;

a step in which the processing unit displays, on a display unit, a list of labels of nodes y, such that there exists a node z∊F(x) and a link y-z is a link in the database D, for each of the nodes x in the retrieval query Q;

a step in which the processing unit receives, through the input unit, input information for so instructing that some of such labels be selected; and a step in which the processing unit adds a node y with L as a label and a link x-y to the retrieval query Q for each of the selected labels L according to the input information.

4. An information retrieval method according to claim 3, further including:

a step in which the processing unit displays a retrieval query Q on the display unit;

a step in which the processing unit receives, through the input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link in the retrieval query Q;

a step in which the processing unit inserts the link according to input information;

a step in which the processing unit receives, through the input unit, input information for instructing the deletion of the node of the retrieval query Q without an end point of the link; and a step in which the processing unit deletes the node from the retrieval query Q according to input information.

5. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to a thesaurus storage unit storing thesaurus T for defining a degree of similarity among the labels of nodes, using similarity among the labels defined by a subset R of thesaurus T according to links that are input, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates are representing the solution;

a step in which the processing unit deletes some elements in the set F of solution candidates from the set F of solution candidates according to input information;

a step in which the processing unit deletes, adds or changes the contents of the subset R and/or the retrieval query Q based on the input information related to deleting, adding or changing the subset R of the thesaurus T and/or the retrieval query Q input through the input unit;

a step of returning to the step of retrieval if there is a request for re-retrieval from the user to repeat the processing, or ending the processing if there is no request;

a step in which the processing unit displays, on a display unit, a list of labels of nodes z which are contained in the shortest paths connecting a node f(x) to a node f(y) in the range of a solution candidate f and not contained in the range f(Q) of some solution candidate f, for each of the links x-y of the retrieval query Q;

a step in which the processing unit receives, through an input unit, input information for so instructing that some of such labels be selected; and a step in which the processing unit adds a node z with the selected element of the list as a label, and links x-z and z-y to the retrieval query Q according to the input information.

6. An information retrieval method according to claim 5, further including:

a step in which the processing unit displays a retrieval query Q on the display unit;

a step in which the processing unit receives, through the input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link in the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q without an end point of the link; and a step in which the processing unit deletes the node from the retrieval query Q according to input information.

7. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query p that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which the processing unit displays, on a display unit, a list of labels M of nodes of the database D, such that the value T(L, M) representing the degree of similarity between a label L of a node x and a label M of a node in the database D is defined in the thesaurus T in the thesaurus storage unit, for every node x in the retrieval query Q;

a step in which the processing unit receives, through the input unit, input information instructing that some such labels M be selected or not selected, input information instructing a change in the value T(L, M) for several such labels M, and input information for specifying several such arbitrary labels M; and a step in which the processing unit permits the definition of T(L, M) to be used in the thesaurus T for the selected label M, inhibiting the definition of T(L, M) from being used for the unselected element M, changing the value of T(L, M) into a specified value for the specified label M, or setting the value of T(L, N) to 1 while permitting the definition of T(L, N) to be used for the specified label N.

8. An information retrieval method according to claim 7, further including:

a step in which the processing unit displays a retrieval query Q on a display unit;

a step in which the processing unit receives, through an input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link of the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q; and a step in which the processing unit deletes the node from the retrieval query Q according to input information.

9. An information retrieval method according to claim 7, including:

a step in which the processing unit displays the following list on the display unit, for each node x in the retrieval query Q {L| for a node y and a node z∈F(x),
L is the label of y and
the link y-z is contained in the database D};

a step in which the processing unit receives, through an input unit, input information for so instructing that some labels be selected; and a step in which the processing unit adds a node Y with L as a label and a link x-Y to the retrieval query Q for each of the selected labels L according to input information.

10. An information retrieval method including:

a step in which processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query Q that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which the processing unit displays the following list on the display unit, for each node x in the retrieval query Q:

{L| for a node y and a node z∈F(x),
L is the label of y and
the link y-z is contained in the database D};

a step in which the processing unit receives, through an input unit, input information for so instructing that some labels be selected; and a step in which the processing unit adds a node Y with L as a label and a link x-Y to the retrieval query Q for each of the selected labels L according to input information.

11. An information retrieval method according to claims 7 or 10, further including:

a step in which the processing unit displays a retrieval query Q on a display unit;

a step in which the processing unit receives, through an input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link of the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q; and a step in which the processing unit deletes the node from the retrieval query Q according to input information.

12. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query Q that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which the processing unit displays, on a display unit, a list of labels of nodes z which are contained in the shortest paths connecting a node f(x) to a node f(y) in the range of a solution candidate f and not contained in the range f(Q) of some solution candidate f, for each of the links x-y of the retrieval query Q;

a step in which the processing unit receives, through the input unit, input information for so instructing that some of such labels be selected; and a step in which the processing unit adds a node z with the selected element of the list as a label, and lines x-z and z-y to the retrieval query Q according to the input information.

13. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query Q that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which the processing unit displays the following list on the display unit, for each node x in the retrieval query Q:

{L| for a node y and a node z∈F(x),
L is the label of y and
the link y-z is contained in the database D};

a step in which the processing unit receives, through an input unit, input information for so instructing that some labels be selected;

a step in which the processing unit adds a node Y with L as a label and a link x-Y to the retrieval query Q for each of the selected labels L according to input information;

a step in which for each label M in the above list, when the size of the following set is smaller than a predetermined value, the processing unit can display, on the display unit, labels of some nodes around y in addition to the label M as elements of the above list, for every element y of the following set:

{y| the label of y is M
for a node z∈F(x), and
the link y-z is contained in the database D}.

14. An information retrieval method according to claim 12 or 13, further including:

a step in which the processing unit displays a retrieval query Q on a display unit;

a step in which the processing unit receives, through an input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link of the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q; and a step in which the processing unit deletes the node from the retrieval query Q according to input information.

15. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to a thesaurus storage unit storing thesaurus T for defining a degree of similarity among the labels of nodes, using similarity among the labels defined by a subset R of thesaurus T according to links that are input, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates are representing the solution;

a step in which the processing unit deletes some elements in the set F of solution candidates from the set F of solution candidates according to input information;

a step in which the processing unit deletes, adds or changes the contents of the subset R and/or the retrieval query Q based on input information related to deleting, adding or changing the subset R of the thesaurus T and/or the retrieval query Q input through the input unit;

a step of returning to the step of retrieval if there is a request for re-retrieval from the user to repeat the processing, or ending the processing if there is no request;

a step in which the processing unit displays, on a display unit, a list of labels M of nodes of a database D, such that the value T(L, M) representing the degree of similarity between a label L of a node x and a label M of a node is defined in the thesaurus T in the thesaurus storage unit, for every node of the retrieval query Q;

a step in which the processing unit receives, through an input unit, input information for so instructing that each such label M be selected or not selected;

a step in which the processing unit, according to the input information, expands the definition of the subset R to include R(L, M)=T(L, M) concerning those M for which R(L, M) has not been defined in the subset R of the thesaurus T, or reduces the definition of R so as not to define R(L, M) concerning those M for which R(L, M) has been defined;

a step in which the processing unit displays, on a display unit, a list of labels of nodes y, such that there exists a node z∈F(x) and a link y-z is a link in the database D, for each of the nodes x in the retrieval query Q;

a step in which the processing unit receives, through the input unit, input information for so instructing that some of such labels be selected; and a step in which the processing unit adds a node y with L as a label and a link x-y to the retrieval query Q for each of the selected labels L according to the input information.

16. An information retrieval method according to claim 15, further including:

a step in which the processing unit displays a retrieval query Q on the display unit;

a step in which the processing unit receives, through the input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link in the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q without an end point of the link; and a step in which the processing unit deletes the node from the retrieval query Q according to input information.

17. An information retrieval method including:

a step in which a processing unit receives, through an input unit, input for a retrieval query Q, which is a graph consisting of nodes, labels of nodes and lines among the nodes;

a step in which the processing unit finds a set F of solution candidates as a result of searching the database in response to the retrieval query Q by making reference to a thesaurus storage unit storing thesaurus T for defining a degree of similarity among the labels of nodes, using similarity among the labels defined by a subset R of thesaurus T according to links that are input, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates are representing the solutions;

a step in which the processing unit deletes some elements in the set F of solution candidates from the set F of solution candidates according to input information;

a step in which the processing unit deletes, adds or changes the contents of the subset R and/or the retrieval query Q based on input information related to deleting, adding or changing the subset R of the thesaurus T and/or the retrieval query Q input through the input unit;

a step of returning to the step of retrieval if there is a request for re-retrieval from the user to repeat the processing, or ending the processing if there is no request;

a step in which the processing unit displays, on a display unit, a list of labels M of nodes of a database D, such that the value T(L, M) representing the degree of similarity between a label L of a node x and a label M of a node is defined in the thesaurus T in the thesaurus storage unit, for every node of the retrieval query Q;

a step in which the processing unit receives, through an input unit, input information for so instructing that each such label M be selected or not selected;

a step in which the processing unit, according to the input information, expands the definition of the subset R to include R(L, M)=T(L, M) concerning those M for which R(L, M) has not been defined in the subset R of the thesaurus T, or reduces the definition of R so as not to define R(L, M) concerning those M for which R(L, M) has been defined;

a step in which the processing unit displays, on a display unit, a list of labels of nodes z which are contained in the shortest paths connecting a node f(x) to a node f(y) in the range of a solution candidate f and not contained in the range f(Q) of some solution candidate f, for each of the links x-y of the retrieval query Q;

a step in which the processing unit receives, through an input unit, input information for so instructing that some of such labels be selected; and a step in which the processing unit adds a node z with the selected element of the list as a label, and links x-z and z-y to the retrieval query Q according to the input information.

18. An information retrieval method according to claim 17, further including:

a step in which the processing unit displays a retrieval query Q on the display unit;

a step in which the processing unit receives, through the input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link in the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q without an end point of the link; and a step in which the processing unit deletes the node from the retrieval query Q according to input information.

19. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to a thesaurus storage unit storing thesaurus T for defining a degree of similarity among the labels of nodes, using similarity among the labels defined by a subset R of thesaurus T according to links that are input, and making reference to a database D storing the nodes and labels that are input;

a step in which the processing unit displays a set F of solution candidates that are found on a display unit;

a step in which the processing unit receives, through the input unit, input information related to whether some elements in the set F of solution candidates are representing the solution;

a step in which the processing unit deletes some elements in the set F of solution candidates from the set F of solution candidates according to input information;

a step in which the processing unit deletes, adds or changes the contents of the subset R and/or the retrieval query Q based on input information related to deleting, adding or changing the subset R of the thesaurus T and/or the retrieval query Q input through the input unit;

a step of returning to the step of retrieval if there is a request for re-retrieval from the user to repeat the processing, or ending the processing if there is no request;

a step in which the processing unit displays, on a display unit, a list of labels M of nodes of a database D, such that the value T(L, M) representing the degree of similarity between a label L of a node x and a label M of a node is defined in the thesaurus T in the thesaurus storage unit, for every node of the retrieval query Q;

a step in which the processing unit receives, through an input unit, input information for so instructing that each such label M be selected or not selected;

a step in which the processing unit, according to the input information, expands the definition of the subset R to include R(L, M)=T(L, M) concerning those M for which R(L, M) has not been defined in the subset R of the thesaurus T, or reduces the definition of R so as not to define R(L, M) concerning those M for which R(L, M) has been defined;

a step in which the processing unit displays, on a display unit, a list of labels of nodes y, such that there exists a node z∈F(x) and a line y-z is a link in the database D, for each of the nodes x in the retrieval query Q;

a step in which the processing unit receives, through the input unit, input information for so instructing that some of such labels be selected;

a step in which the processing unit adds a node y with L as a label and a link x-y to the retrieval query Q for each of the selected labels L according to the input information;

a step in which the processing unit displays, on a display unit, a list of labels of nodes z which are included in the shortest paths connecting a node f(x) to a node f(y) in the range of a solution candidate f and not contained in the range f(Q) of some solution candidate f, for each of the links x-y of the retrieval query Q;

a step in which the processing unit receives, through an input unit, input information for so instructing that some of such labels be selected; and a step in which the processing unit adds a node z with the selected element of the list as a label, and links x-z and z-y to the retrieval query Q according to the input information.

20. An information retrieval method according to claim 19, further including:

a step in which the processing unit displays a retrieval query Q on the display unit;

a step in which the processing unit receives, through the input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link in the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q without an end point of the link; and a step in which the processing unit deletes the node from the retrieval query Q according to input information.

21. An information retrieval method including:

a step in which a Processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query Q that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which the processing unit displays, on a display unit, a list of labels M of nodes of the database D, such that the value T(L, M) representing the degree of similarity between a label L of a node x and a label M of a node in the database D is defined in the thesaurus T in the thesaurus storage unit, for every node x in the retrieval query Q;

a step in which the processing unit receives, through the input unit, input information instructing that some such labels M be selected or not selected, input information instructing a change in the value T(L, M) for several such labels M, and input information for specifying several such arbitrary labels M;

a step in which the processing unit permits the definition of T(L, M) to be used in the thesaurus T for the selected label M, inhibiting the definition of T(L, M) from being used for the unselected element M, changing the value of T(L, M) into a specified value for the specified label M, or setting the value of T(L, N) to 1 while permitting the definition of T(L, N) to be used for the specified label N;

further including a step in which for each label M in the above list, when the size of the following set is smaller than a predetermined value, the processing unit can display, on the display unit, labels of some nodes around y in addition to the label M as elements of the above list, for every element y of the following set:

{y| the label of y is M for a node z∈F(x), and the link y-z is contained in the database D}.

22. An information retrieval method including:

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query Q that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which the processing unit displays, on a display unit, a list of labels M of nodes of the database D, such that the value T(L, M) representing the degree of similarity between a label L of a node x and a label M of a node in the database D is defined in the thesaurus T in the thesaurus storage unit, for every node x in the retrieval query Q;

a step in which the processing unit receives, through the input unit, input information instructing that some such labels M be selected or not selected, input information instructing a change in the value T(L, M) for several such labels M, and input information for specifying several such arbitrary labels M;

a step in which the processing unit permits the definition of T(L, M) to be used in the thesaurus T for the selected label M, inhibiting the definition of T(L, M) from being used for the unselected element M, changing the value of T(L, M) into a specified value for the specified label M, or setting the value of T(L, N) to 1 while permitting the definition of T(L, N) to be used for the specified label N;

a step in which the processing unit displays, on a display unit, a list of labels of nodes z which are contained in the shortest paths connecting a node f(x) to a node f(y) in the range of a solution candidate f and not contained in the range f(Q) of some solution candidate f for each of the links x-y of the retrieval query Q;

a step in which the processing unit receives, through the input unit, input information for so instructing that some of such labels be selected; and a step in which the processing unit adds a node z with the selected element of the list as a label, and links x-z and z-y to the retrieval query Q according to the input information.

23. An information retrieval method according to claim 21 or 22, further including:

a step in which the processing unit displays a retrieval query Q on a display unit;

a step in which the processing unit receives, through an input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link of the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query Q according to input information;

a step in which the processing unit receives, through the input unit, input information for instructing the deletion of the node of the retrieval query Q; and a step in which the processing unit deletes the node from the retrieval query Q according to input information.

24. An information retrieval method including;

a step in which a processing unit receives, through an input unit, input for a retrieval query Q, which is a graph consisting of nodes, labels of nodes and links among the nodes;

a step in which the processing unit finds a set F of solution candidates as a result of searching the database in response to the retrieval query Q by making reference to the thesaurus storage unit storing thesaurus T for defining a degree of similarity among the labels of nodes, using the degree of similarity among the labels defined in a portion of thesaurus T determined to be usable according to the retrieval query Q that is input, and making reference to the database D;

a step in which the processing unit displays the set F of solution candidates that are found on a display unit;

a step in which the processing unit receives, through the input unit, input information related to whether some elements in the set F of solution candidates represent solutions;

a step in which the processing unit deletes some elements from the set F of solution candidates according to input information;

a step in which the processing unit deletes, adds or changes the content of the thesaurus T and/or the retrieval query Q based on input information related to deleting, adding or changing the thesaurus T and/or the retrieval query Q input through the input unit;

a step in which the processing unit returns to the step of retrieval if there is a request for re-retrieval from the user to repeat the processing, or ends the processing if there is no request;

a step in which for each label M in the above list, when the size of the following set is smaller than a predetermined value, the processing unit can display, on the display unit, labels of some nodes around y in addition to the label M as elements of the above list, for every element y of the following set:

{y| the label of y is M
for a node z∈F(x), and
the link y-z is contained in the database D};

a step in which the processing unit displays, on a display unit, a list of labels of nodes z which are contained in the shortest paths connecting a node f(x) to a node f(y) in the range of a solution candidate f and not contained in the range f(Q) of some solution candidate f, for each of the links x-y of the retrieval query Q;

a step in which the processing unit receives, through the input unit, input information for so instructing that some of such labels be selected; and a step in which the processing unit adds a node z with the selected element of the list as a label, and links x-z and z-y to the retrieval query Q according to the input information.

25. An information retrieval method according to claim 24, further including:

a step in which the processing unit displays a retrieval query Q on a display unit;

a step in which the processing unit receives, through an input unit, input information which, when there is no link connecting two nodes of the retrieval query Q, instructs to insert a link;

a step in which the processing unit inserts the link according to input information;

a step in which the processing unit receives, through the input unit, input information for instructing the deletion of the link of the retrieval query Q;

a step in which the processing unit deletes the link according to input information;

a step in which the processing unit receives, through the input unit, input information for instructing the addition of a new node to the retrieval query Q;

a step in which the processing unit adds the node to the retrieval query A according to input information;

a step in which the processing unit receives, through the input unit, input information for instructing the deletion of the node of the retrieval query Q; and a step in which the processing unit deletes the node from the retrieval query Q according to input information.

* * * * *